(12) United States Patent
Asif Bashir et al.

(10) Patent No.: US 10,997,989 B1
(45) Date of Patent: May 4, 2021

(54) BILAYER HOT SEED TO REDUCE GAP FIELD FOR MAGNETIC RECORDING HEADS

(71) Applicant: Western Digital Technologies, Inc., San Jose, CA (US)

(72) Inventors: Muhammad Asif Bashir, San Jose, CA (US); Alexander Goncharov, Morgan Hill, CA (US); Petrus Antonius Van Der Heijden, Cupertino, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 119 days.

(21) Appl. No.: 16/438,377

(22) Filed: Jun. 11, 2019

(51) Int. Cl.
　　*G11B 5/31*　　(2006.01)
　　*G11B 5/23*　　(2006.01)
　　*G11B 5/127*　　(2006.01)

(52) U.S. Cl.
　　CPC .............. *G11B 5/23* (2013.01); *G11B 5/1278* (2013.01); *G11B 5/315* (2013.01); *G11B 5/3146* (2013.01); *G11B 5/3153* (2013.01)

(58) Field of Classification Search
　　None
　　See application file for complete search history.

(56) References Cited

U.S. PATENT DOCUMENTS

| | | |
|---|---|---|
| 8,238,059 B1 | 8/2012 | Tang et al. |
| 8,564,903 B2 | 10/2013 | Min et al. |
| 8,582,240 B1 | 11/2013 | Chen et al. |
| 9,047,888 B2 | 6/2015 | Katada et al. |
| 9,230,571 B1 | 1/2016 | Chen et al. |
| 9,230,573 B1 | 1/2016 | Etoh et al. |
| 9,275,672 B2 | 3/2016 | Shiroishi et al. |
| 9,286,916 B1 | 3/2016 | Rivkin et al. |
| 9,299,367 B1 | 3/2016 | Tang et al. |
| 9,361,923 B1 * | 6/2016 | Liu ....................... G11B 5/3116 |

(Continued)

FOREIGN PATENT DOCUMENTS

| | | |
|---|---|---|
| CN | 104835510 B | 11/2017 |
| JP | 2013251042 A | 12/2013 |
| WO | 2015126326 A1 | 8/2015 |

OTHER PUBLICATIONS

Mallary, Mike et al; "Head and Media Challenges for 3 Tb/in2 Microwave-Assisted Magnetic Recording"; IEEE Transactions on Magnetics, vol. 50, No. 7, Jul. 2014 (8 pages).

(Continued)

*Primary Examiner* — Jefferson A Evans
(74) *Attorney, Agent, or Firm* — Patterson & Sheridan, LLP; Steven H. Versteeg

(57) ABSTRACT

The present disclosure generally relates to data storage devices, and more specifically, to a magnetic media drive employing a magnetic recording head. A magnetic recording head comprises a main pole disposed between a leading shield and a trailing shield. A spin torque oscillator is disposed between the main pole and the trailing shield at a media facing surface. A hot seed bilayer is disposed between the spin torque oscillator and the trailing shield, where the hot seed bilayer is conformal with the spin torque oscillator. The hot seed bilayer comprises a first layer comprised of a high magnetic moment material disposed at the media facing surface and a second layer comprised of a low magnetic material recessed from the media facing surface.

20 Claims, 5 Drawing Sheets

(56) References Cited

U.S. PATENT DOCUMENTS

| | | | |
|---|---|---|---|
| 9,368,135 B2 | 6/2016 | Gao | |
| 9,536,548 B1 * | 1/2017 | Narayana | G11B 5/3116 |
| 9,881,637 B1 | 1/2018 | Wilson et al. | |
| 10,121,497 B1 | 11/2018 | Takahashi et al. | |
| 10,157,632 B1 * | 12/2018 | Song | G11B 5/315 |
| 10,186,284 B2 | 1/2019 | Narita et al. | |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 10,734,015 B1 * | 8/2020 | Song | G11B 5/315 |
| 10,762,917 B1 * | 9/2020 | Le | G11B 5/3116 |
| 10,839,832 B1 * | 11/2020 | Goncharov | G11B 5/1278 |
| 2008/0304176 A1 | 12/2008 | Takagishi et al. | |
| 2009/0059423 A1 | 3/2009 | Yamada et al. | |
| 2009/0310244 A1 | 12/2009 | Shimazawa et al. | |
| 2011/0096443 A1 * | 4/2011 | Zhang | G01R 33/098 360/324.2 |
| 2011/0279921 A1 * | 11/2011 | Zhang | G11C 11/161 360/59 |
| 2013/0250456 A1 | 9/2013 | Yamada et al. | |
| 2014/0139952 A1 | 5/2014 | Takeo et al. | |
| 2014/0177100 A1 | 6/2014 | Sugiyama et al. | |
| 2016/0027455 A1 | 1/2016 | Kudo et al. | |
| 2017/0236537 A1 | 8/2017 | Murakami et al. | |
| 2018/0144768 A1 * | 5/2018 | Liu | G11B 5/187 |
| 2018/0268848 A1 | 9/2018 | Narita et al. | |
| 2019/0088274 A1 | 3/2019 | Narita et al. | |
| 2019/0198566 A1 * | 6/2019 | Wang | H01L 27/226 |
| 2020/0312354 A1 * | 10/2020 | Wu | G11B 5/3143 |
| 2020/0372929 A1 * | 11/2020 | Le | G11B 5/115 |

OTHER PUBLICATIONS

Guan et al. "A Trailing Shield Perpendicular Writer Design With Tapered Write Gap for High Density Recording," Magnetics, IEEE Transactions on Magnetics, vol. 44, No. 11, Dec. 2008, pp. 3396-3399. 10.1109/TMAG.2008.2002608.

* cited by examiner

BILAYER HOT SEED TO REDUCE GAP FIELD FOR MAGNETIC RECORDING HEADS

BACKGROUND OF THE DISCLOSURE

Field of the Disclosure

Embodiments of the present disclosure generally relate to data storage devices, and more specifically, to a magnetic media drive employing a magnetic recording head.

Description of the Related Art

Over the past few years, various magnetic recording methods have been studied to improve the areal density of a magnetic media device, such as a hard disk drive (HDD). Magnetic recording heads, or write heads, in HDDs can have a significant effect on the overall performance and reliability of the recording device. Magnetic recording heads may be designed to achieve specific advantages, such as improved performance, but may consequently have a negative impact on other characteristics, such as decreased reliability.

For example, magnetic recording heads may be designed to achieve a high down-track gradient and a high bit per inch capability. However, such magnetic recording heads may experience an increased gap field, causing a field generation layer of a spin torque oscillator to undesirably precess in the shunting direction. One approach taken to reduce the gap field is to increase the thickness of the trailing gap, or to change the shape of the trailing gap to be wedge-shaped. However, wedge-shaped trailing gaps are very difficult to manufacture, and increasing the thickness of the trailing gap results in a reduction of the downtrack effective field gradient, which prevents the magnetic recording head from meeting a demand to write smaller magnetic bit sizes.

Therefore, there is a need in the art for an improved write head design.

SUMMARY OF THE DISCLOSURE

The present disclosure generally relates to data storage devices, and more specifically, to a magnetic media drive employing a magnetic recording head. A magnetic recording head comprises a main pole disposed between a leading shield and a trailing shield. A spin torque oscillator is disposed between the main pole and the trailing shield at a media facing surface. A hot seed bilayer is disposed between the spin torque oscillator and the trailing shield, where the hot seed bilayer is conformal with the spin torque oscillator. The hot seed bilayer comprises a first layer comprised of a high magnetic moment material disposed at the media facing surface and a second layer comprised of a low magnetic material recessed from the media facing surface.

In one embodiment, a magnetic recording head comprises a main pole extending to a media facing surface, a trailing shield disposed adjacent to a first surface of the main pole, a spin torque oscillator disposed between the first surface of the main pole and the trailing shield at the media facing surface, and a hot seed bilayer disposed between the spin torque oscillator and the trailing shield. The hot seed bilayer comprises a first layer comprising a first material in contact with the trailing shield and a second layer comprising a second material disposed adjacent to the first surface of the main pole. The first material has a higher magnetic moment than that the second material.

In another embodiment, a magnetic recording head comprises a main pole extending to a media facing surface, a trailing shield disposed adjacent to the main pole, the trailing shield extending to the media facing surface, a spin torque oscillator disposed between the main pole and the trailing shield at the media facing surface, and a hot seed bilayer disposed between the spin torque oscillator and the trailing shield. The hot seed bilayer comprises a first layer comprising a first material in contact with the trailing shield and a second layer comprising a second material disposed adjacent to a surface of the main pole. The first material has a higher magnetic moment than that the second material. A thickness of the first layer accounts for about 30% to about 70% of a total thickness of the hot seed bilayer. The magnetic recording head further comprises a notch disposed between the hot seed bilayer and the spin torque oscillator, the notch being conformal with the spin torque oscillator.

In another embodiment, a magnetic recording head comprises a main pole extending to a media facing surface, a trailing shield disposed adjacent to the main pole, the trailing shield extending to the media facing surface, a trailing gap disposed between the main pole and the trailing shield, the trailing gap having a width of about 15 nm to about 30 nm, a spin torque oscillator disposed between the main pole and the trailing shield at the media facing surface, and a hot seed bilayer disposed between the spin torque oscillator and the trailing shield, the hot seed bilayer comprising a first layer comprising a first material and a second layer comprising a second material disposed adjacent to a surface of the main pole. The first material has a higher magnetic moment than that the second material. The first layer is disposed at the media facing surface and in contact with the trailing shield and the second layer is recessed from the media facing surface. A stripe height of the hot seed bilayer is equal to a stripe height of the spin torque oscillator.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, and more specifically, to a magnetic media drive employing a magnetic recording head. A magnetic recording head comprises a main pole disposed between a leading shield and a trailing shield. A spin torque oscillator is disposed between the main pole and the trailing shield at a media facing surface. A hot seed bilayer is disposed between the spin torque oscillator and the trailing shield, where the hot seed bilayer is conformal with the spin torque oscillator. The hot seed bilayer comprises a first layer comprised of a high magnetic moment material disposed at the media facing surface and a second layer comprised of a low magnetic material recessed from the media facing surface.

Figure 1:
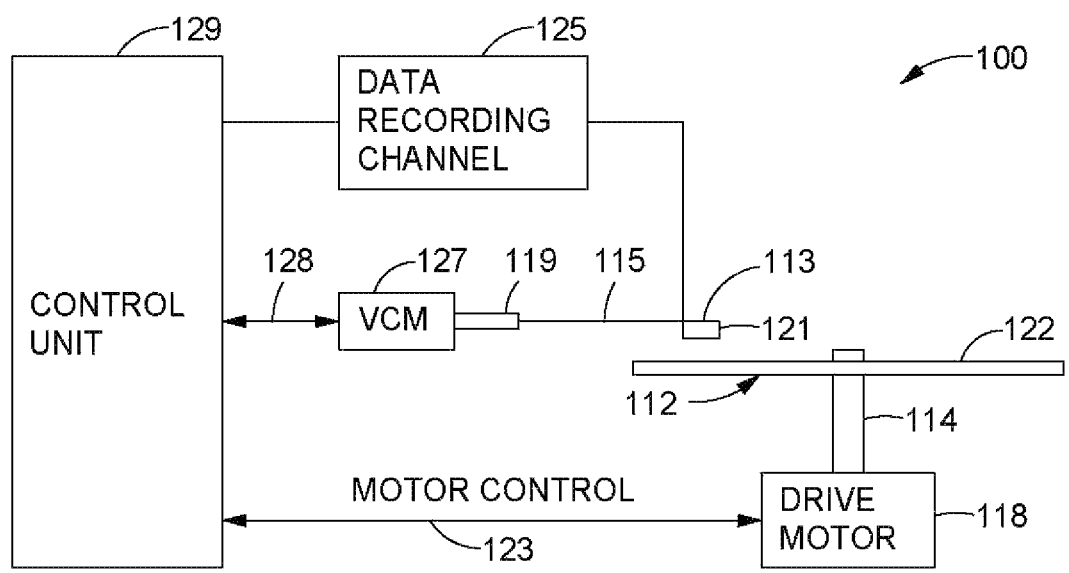
FIG. 1 illustrates a disk drive embodying this disclosure.

FIG. 1 illustrates a disk drive 100 embodying this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the media 112 surface by a small, substantially constant spacing during normal operation. The AC magnetic field generated from the magnetic head assembly 121 lowers the coercivity of the high-coercivity media so that the write elements of the magnetic head assemblies 121 may correctly magnetize the data bits in the media 112.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
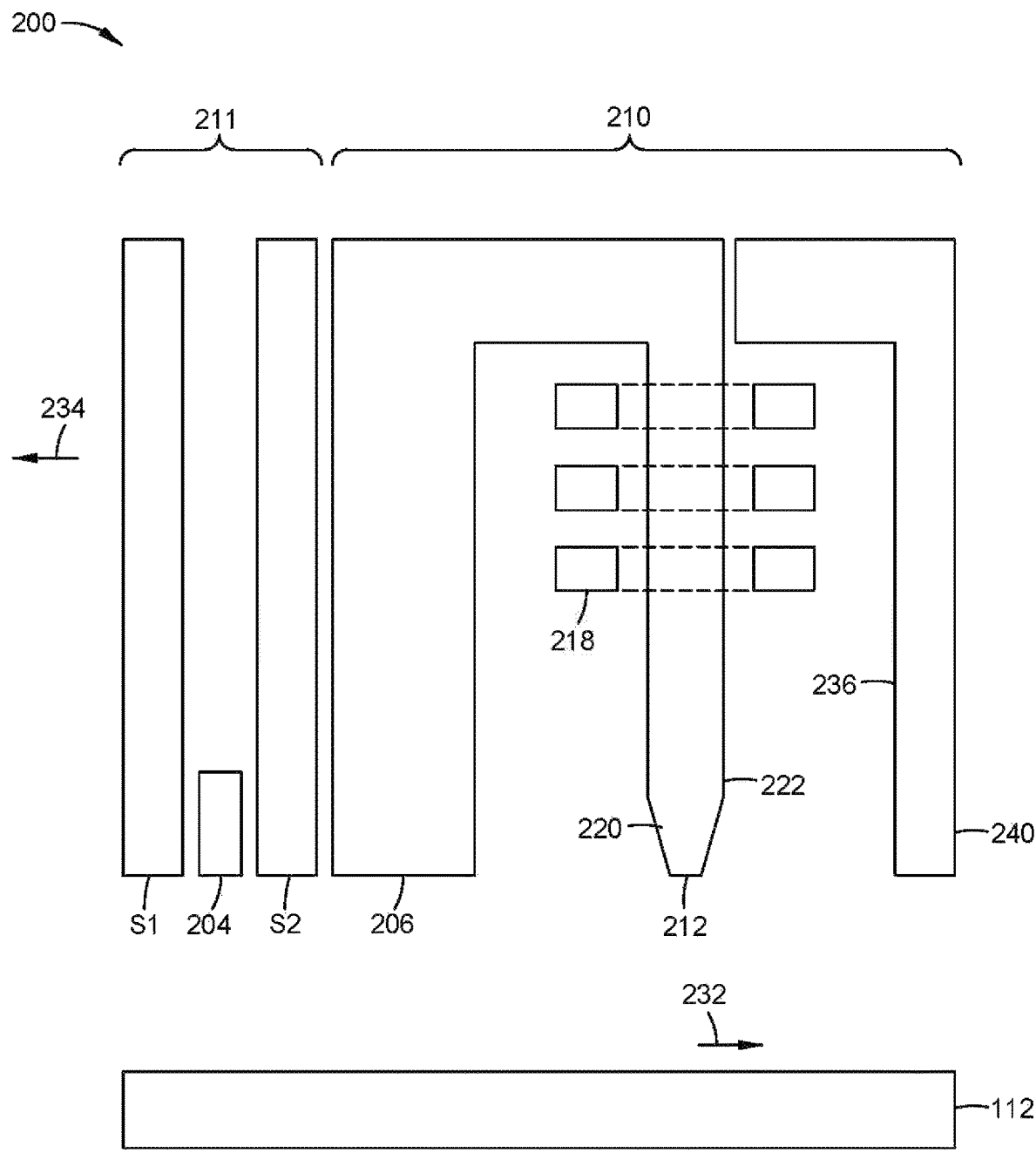
FIG. 2 is a fragmented, cross-sectional side view through the center of a read/write head facing a magnetic media, according to one embodiment.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head, such as a microwave-assisted magnetic recording (MAMR) head. In FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap (not shown) and a leading gap (not shown) may be in contact with the main pole and a leading shield (not shown) may be in contact with the leading gap. A recording magnetic field is generated from the main pole 220 and the trailing shield 240 helps making the magnetic field gradient of the main pole 220 steep. The main pole 220 may be a magnetic material such as an FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, the main pole 220 has a saturated magnetization (Ms) of 2.4 T and a thickness of about 300 nanometers (nm). The trailing shield 240 may be a magnetic material such as NiFe alloy. In one embodiment, the trailing shield 240 has an Ms of about 1.2 T to about 1.6 T.

Figure 3:
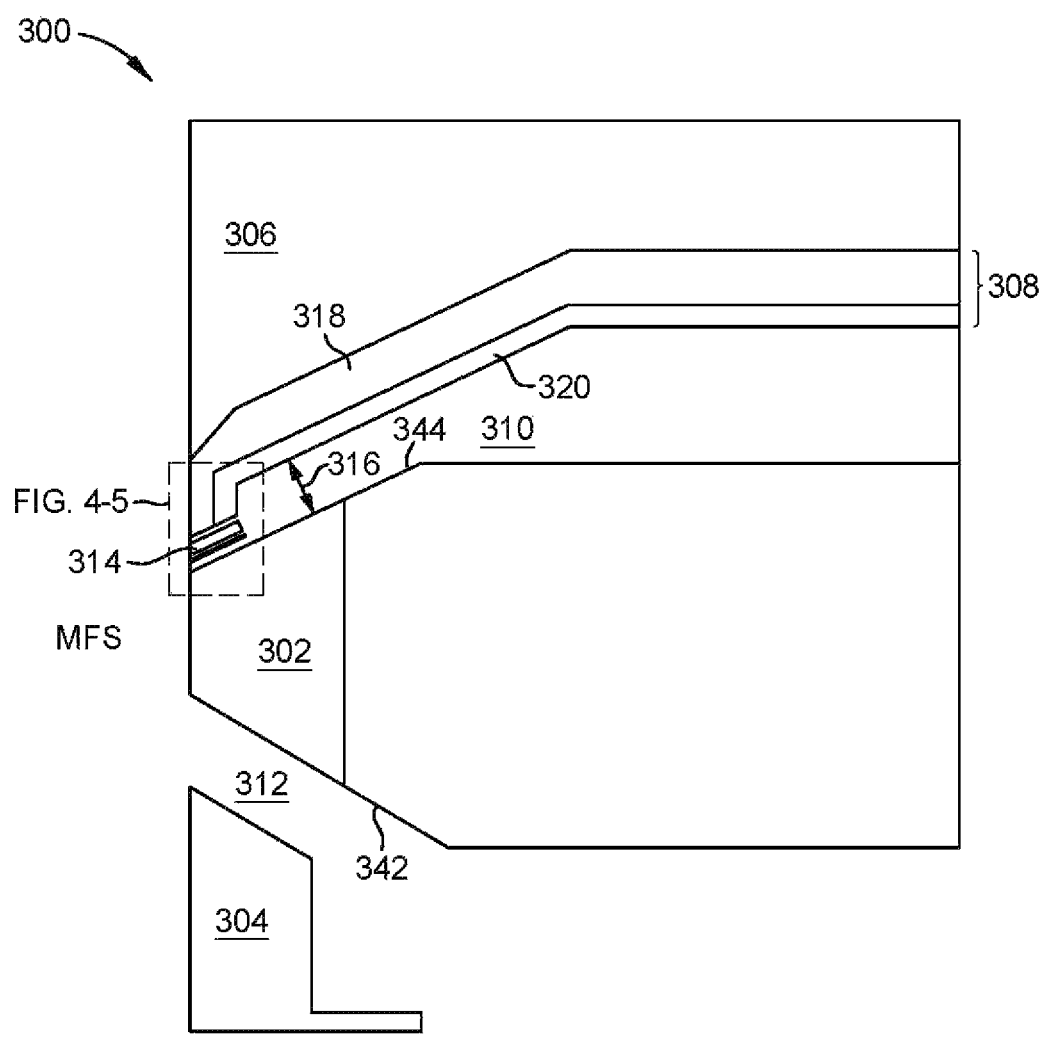
FIG. 3 illustrates a cross-sectional view of a magnetic recording head, according to another embodiment.
Figure 4:
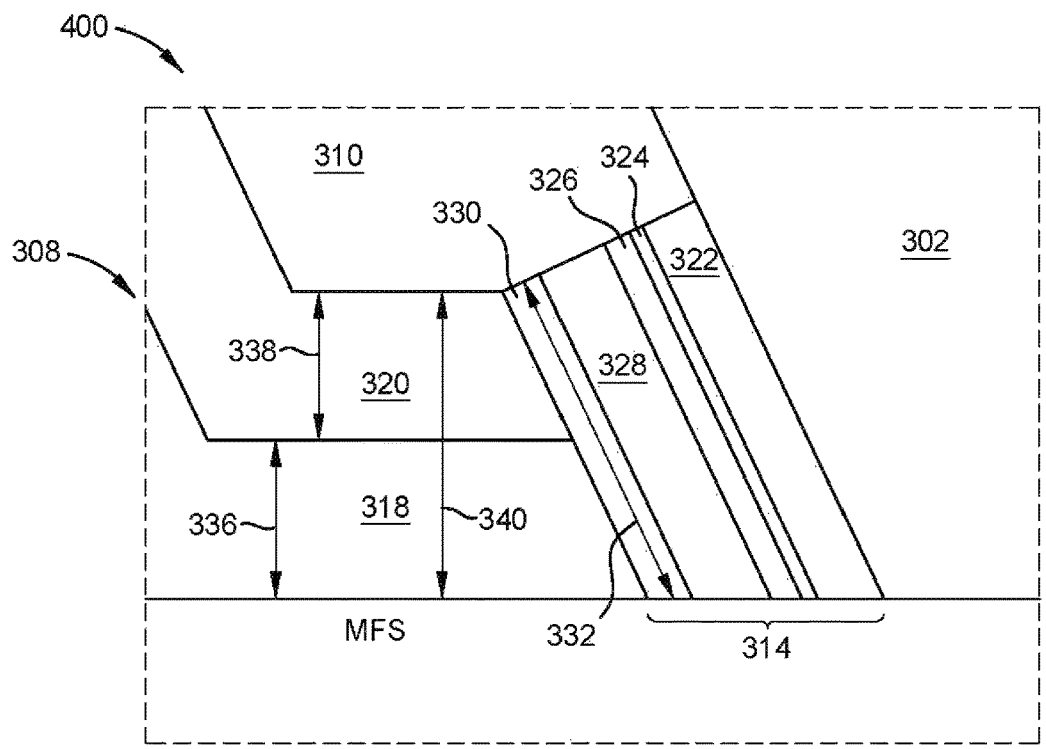
FIG. 4 illustrates a zoomed in view of the magnetic recording head of FIG. 3, according to one embodiment.
Figure 5:
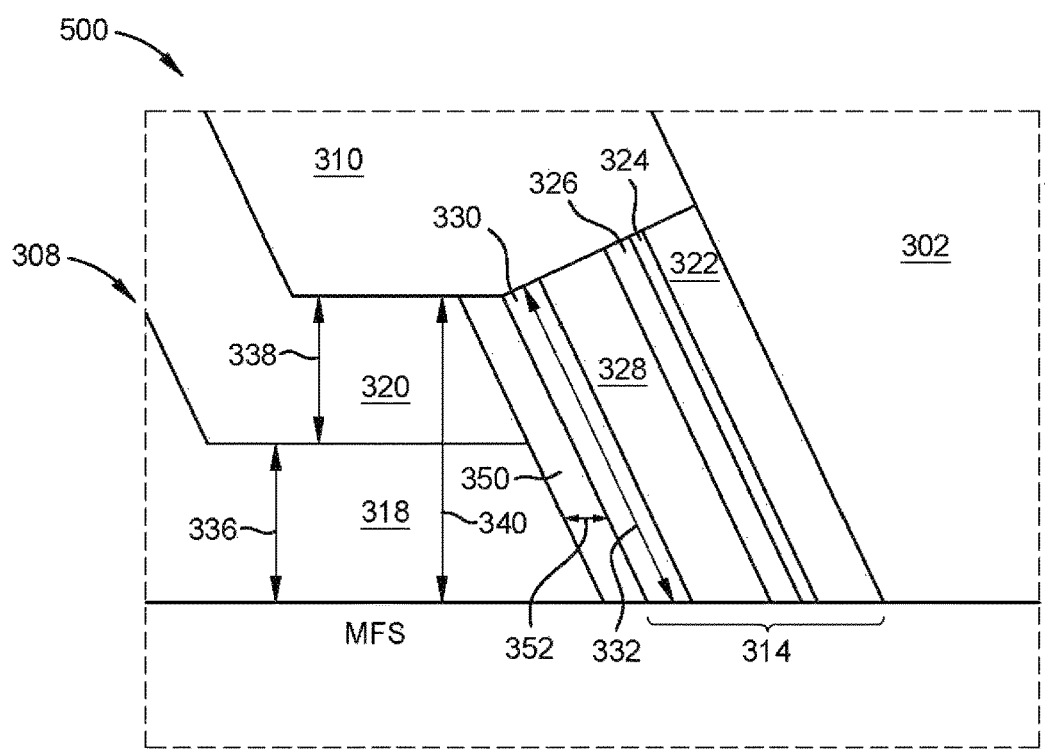
FIG. 5 illustrates a zoomed in view of the magnetic recording head of FIG. 3, according to another embodiment.
Figure 6A:
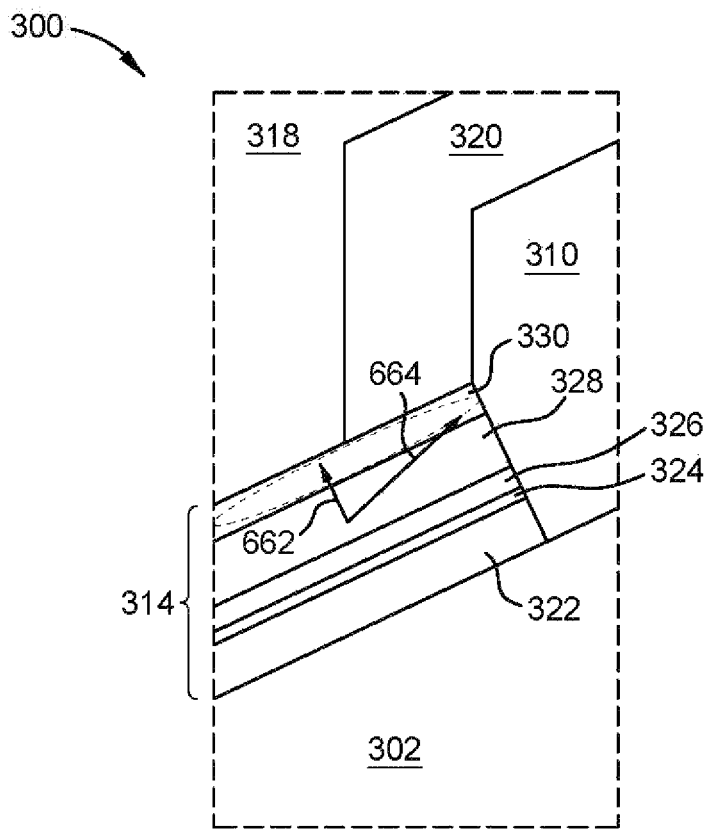
FIGS. 6A-6B illustrate the magnetic recording head of FIG. 3 experiencing different levels of shunting, according to various embodiments.
Figure 6B:
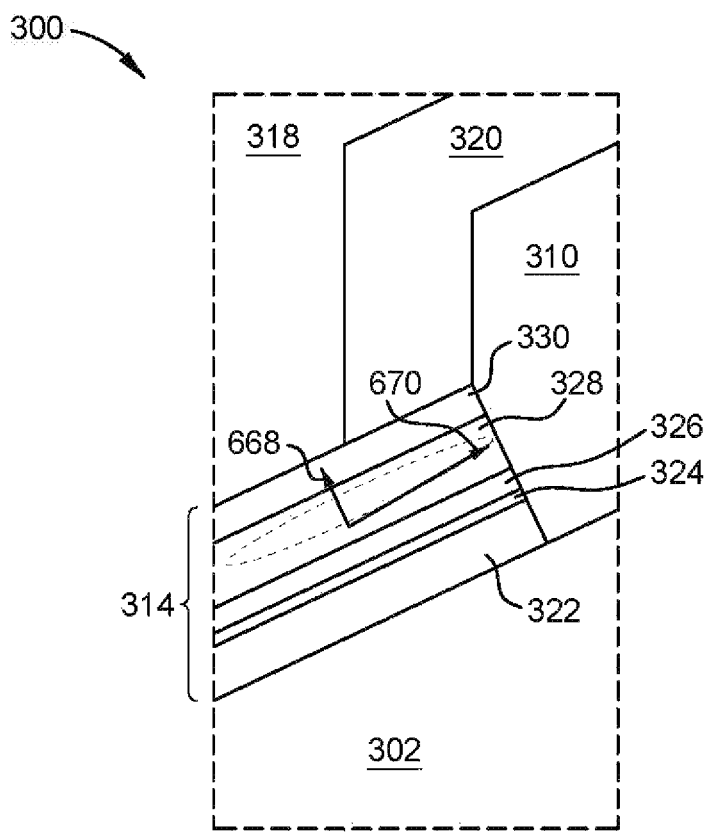

FIG. 3 illustrates a cross-sectional view of a magnetic recording head 300, according to another embodiment. FIG. 4 illustrates a zoomed-in view of a magnetic recording head 400, according to one embodiment. FIG. 5 illustrates a zoomed-in view of a magnetic recording head 500, according to another embodiment. The magnetic recording heads 400, 500 of FIGS. 4 and 5, respectively, illustrate different embodiments of a close up view of the boxed portion labeled FIGS. 4-5 of the magnetic recording head 300 of FIG. 3. All components of the magnetic recording head 400 of FIG. 4 are the same as the components of the magnetic recording head 500 of FIG. 5; however, the magnetic recording head 500 includes a notch 350, as discussed in further detail below. FIGS. 6A-6B illustrate the magnetic recording head of FIG. 3 experiencing different levels of shunting, according to various embodiments. The magnetic recording heads 300, 400, 500 may correspond to the magnetic head assembly 121 described in FIG. 1 or the read/write head 200 described in FIG. 2.

The magnetic recording head 300 comprises a main pole 302 disposed between a leading shield 304 and a trailing shield 306. The main pole 302, leading shield 304, and trailing shield 306 each extend to the MFS. A leading gap 312 extending to the MFS is disposed between the main pole 302 and the leading shield 304, and a trailing gap 310 extending to the MFS is disposed between the trailing shield 306 and the main pole 302. The leading gap 312 contacts a first surface 342 of the main pole 302, and the trailing gap 310 contacts a second surface 344 of the main pole 302 opposite the first surface 342. The trailing gap has a thickness or width 316 of about 15 nm to about 30 nm, such as about 22 nm at the MFS.

A hot seed bilayer 308 is disposed between the trailing shield 306 and the trailing gap 310. The hot seed bilayer 308 comprises a first layer 318 disposed on the trailing shield 306 and a second layer 320 disposed adjacent to the trailing gap 310. The first layer 318 extends to the MFS while the second layer 320 is recessed from the MFS. The hot seed bilayer 308 is disposed between trailing shield 306 and the trailing gap 310 such that the trailing gap 310 is spaced from the trailing shield 306. A spin torque oscillator (STO) 314 is disposed at the MFS in the trailing gap 310 between the first surface 342 of the main pole 302 and the hot seed bilayer 308.

The first layer 318 of the hot seed bilayer 308 comprises a high magnetic moment material. In some embodiments, the first layer 318 has a magnetic moment of about 2.3 T, such as about 2.35 T. The first layer 318 may comprise cobalt iron. The second layer 320 of the hot seed bilayer 308 comprises a low magnetic moment material. In some embodiments, the second layer 320 has a magnetic moment of about 1 T to about 2 T. The second layer 320 may comprise nickel iron, such as nickel iron 65/35 or nickel iron 80/20.

As shown in FIGS. 4 and 5, the STO 314 comprises a seed layer 322 disposed on the main pole 302, a spin polarization layer (SPL) 324 disposed on the seed layer 322, a spacer layer 326, such as a copper layer, disposed on the SPL 324, a field generation layer (FGL) 328 disposed on the spaced layer 326, and a cap layer 330 disposed on the FGL 328. The STO 314 is conformal with the hot seed bilayer 308. As such, the stripe height 332 of the STO 314 is the same as the stripe height 332 of the hot seed bilayer 308. In one embodiment, the stripe height 332 of the STO 314 and the hot seed bilayer 308 is about 10 nm to about 50 nm, such as about 20 nm to about 40 nm. The stripe height 332 of the STO 314 may be equal to the depth the STO 314 extends in the track width direction of the magnetic recording head 400, 500 (i.e., in the z-direction). For example, if the STO 314 has a stripe height 332 of about 20 nm, the STO 314 may have a depth extending into the z-direction of the magnetic recording head 400, 500 of about 20 nm.

In the magnetic recording heads 400, 500 of both FIG. 4 and FIG. 5, the first layer 318 has a first thickness 336 and the second layer 320 has a second thickness 338. The first thickness 336 may be the same as the second thickness 338, or the first thickness 336 may be different than the second thickness 338. For example, the first thickness 336 may account for about 30% to about 70% of the total thickness 340 of the hot seed layer 308 (i.e., the first thickness 336 plus the second thickness 338). Similarly, the second thickness 338 may account for about 30% to about 70% of the total thickness 340 of the hot seed layer 308. In one embodiment, the first thickness 336 of the first layer 318 is equal to the second thickness 338 of the second layer 320 (i.e., both the first layer 318 and the second layer 320 account for about 50% of the total thickness of the hot seed layer 308). The total thickness 340 of the hot seed bilayer 308 is about 10 nm to about 50 nm, such as about 20 nm to about 40 nm.

However, making the thickness of either the first layer 318 or the second layer 320 too thick may cause one or more properties of the magnetic recording heads 400, 500 to suffer. As such, the thickness 336 of the first layer 318 and the thickness 338 of the second layer 320 are balanced and selected in order to increase the performance of the STO 314 and of the overall magnetic recording head 400, 500.

In the magnetic recording head 400 of FIG. 4, the cap layer 330 is in contact with both the first layer 318 and the second layer 320 of the hot seed bilayer 308. However, the magnetic recording head 500 of FIG. 5 comprises a notch 350 disposed between the cap layer 330 of the STO 314 and the hot seed bilayer 308. The notch 350 is in contact with both the first layer 318 and the second layer 320 of the hot seed bilayer 308. The notch 350 is conformal with the STO 314 and the hot seed bilayer 308, and the stripe height of the notch is equal to the stripe height 332 of the STO 314 and hot seed bilayer 308. The notch 350 may have a thickness 352 of about 1 nm to about 10 nm. The notch 350 may comprise a high moment material, such as cobalt iron, or a low moment material, such as nickel iron 65/35 or nickel iron 80/20. The notch 350 may comprise the same material as either the first layer 318 or the second layer 320.

The material and the thickness 352 of the notch 350 vary depending on the thicknesses 336, 338 of the first layer 318 and the second layer 320, as well as the desired properties of the magnetic recording head 500. For example, a magnetic recording head having a thicker first layer 318 and a thinner second layer 320 (i.e., unbalanced proportions) may have an increased down-track gradient and higher bit per inch (BPI) capabilities, but may also experience a larger gap field and a lower FGL angle, resulting in the FGL 328 precessing in the shunting direction.

FIG. 6A illustrates the magnetic recording head 300 experiencing higher shunting, according to one embodiment. In FIG. 6A, the direction of the gap field is represented by the arrow 662. The magnetization of the FGL 328 is represented by the arrow 664 and dotted-line circle. The FGL magnetization 664 is precessing in-plane; however, the magnetization 664 is tilted towards the gap field 662, which produces higher shunting (i.e., causes the FGL 328 to precess in the shunting direction). Shunting is higher when the angle between the gap field 662 and the FGL magnetization 664 is closer to 0°.

Conversely, a magnetic recording head having a thicker second layer 320 and a thinner first layer 318 (i.e., unbalanced proportions) may have a reduced gap field and a higher FGL angle, resulting in the FGL 328 precessing more in the in-plane direction, but may have a reduced gradient and lower BPI capabilities. As such, the proportion of the first layer 318 to the second layer 320 must be balanced. The notch 350 may optionally be included to help balance the proportion, in which case the material and the thickness of the notch 350 are selected in order to obtain a reduced gap field, a higher FGL angle, an increased gradient, and higher BPI capabilities.

FIG. 6B illustrates the magnetic recording head 300 experiencing lower shunting, or processing more in the in-plane direction, according to another embodiment. In FIG. 6B, the direction of the gap field is represented by the arrow 668 and dotted-line circle. The magnetization of the FGL 328 is represented by the arrow 670. The FGL magnetization 670 is precessing in-plane, and the magnetization 670 is disposed almost perpendicular to the gap field 668, resulting in lower shunting being produced (i.e., causing the FGL 328 to precess more in the in-plane direction). Shunting is lower when the angle between the gap field 668 and the FGL magnetization 670 is closer to 90°.

In the magnetic recording heads 400, 500 of both FIG. 4 and FIG. 5, the first layer 318 comprised of the high magnetic moment material is disposed at the MFS and the second layer 320 comprised of the low magnetic moment material is recessed from the MFS, which increases the overall performance of the magnetic recording heads 400, 500. The first layer 318 being disposed at the MFS increases the gradient and BPI capabilities of the magnetic recording heads 400, 500 while the second layer 320 being recessed from the MFS reduces the gap field, increases the FGL angle, and improves the gap field asymmetry. As such, the hot seed bilayer 308 may be utilized with a smaller trailing gap 310 (e.g., a thickness 316 of about 15 nm to about 30 nm) while achieving a reduced gap field, and without sacrificing the gradient or BPI capabilities of the magnetic recording heads 400, 500.

Therefore, a hot seed bilayer having a first layer comprised of a high magnetic moment material disposed at the media facing surface and a second layer comprised of a low magnetic material recessed from the media facing surface enables a magnetic recording head to obtain a reduced gap field, a higher FGL angle, an increased gradient, and higher BPI capabilities. Such a hot seed bilayer increases the performance of the STO, as the FGL of the STO precesses more in the in-plane direction, rather than in the shunting direction. Additionally, such a hot seed bilayer may be utilized with a smaller trailing gap while still achieving the same desired properties, reducing the overall size of the magnetic recording head.

A magnetic recording head comprises a main pole extending to a media facing surface, a trailing shield disposed adjacent to a first surface of the main pole, a spin torque oscillator disposed between the first surface of the main pole and the trailing shield at the media facing surface, and a hot seed bilayer disposed between the spin torque oscillator and the trailing shield. The hot seed bilayer comprises a first layer comprising a first material in contact with the trailing shield and a second layer comprising a second material disposed adjacent to the first surface of the main pole. The first material has a higher magnetic moment than that the second material.

The first layer of the hot seed bilayer and the second layer of the hot seed bilayer may have the same thickness. The first material of the hot seed bilayer and the second material of the hot seed bilayer may have different thicknesses. The first layer of the hot seed bilayer may be disposed at the media facing surface and the second layer of the hot seed bilayer may be recessed from the media facing surface. The first layer may have a magnetic moment of about 2.3 T and the second layer may have a magnetic moment of about 1 T to about 2 T. The first layer of the hot seed bilayer may comprise cobalt iron and the second layer of the hot seed bilayer may comprise nickel iron.

A magnetic recording head comprises a main pole extending to a media facing surface, a trailing shield disposed adjacent to the main pole, the trailing shield extending to the media facing surface, a spin torque oscillator disposed between the main pole and the trailing shield at the media facing surface, and a hot seed bilayer disposed between the spin torque oscillator and the trailing shield. The hot seed bilayer comprises a first layer comprising a first material in contact with the trailing shield and a second layer comprising a second material disposed adjacent to a surface of the main pole. The first material has a higher magnetic moment than that the second material. A thickness of the first layer accounts for about 30% to about 70% of a total thickness of the hot seed bilayer. The magnetic recording head further comprises a notch disposed between the hot seed bilayer and the spin torque oscillator, the notch being conformal with the spin torque oscillator.

The hot seed bilayer may be conformal with the spin torque oscillator. The hot seed bilayer may have a stripe height of about 20 nm to about 40 nm. The notch may comprise a high magnetic moment material. The notch may comprise a low magnetic moment material. The notch may be conformal with the spin torque oscillator. The first layer of the hot seed bilayer may have a magnetic moment of about 2.3 T and the second layer of the hot seed bilayer may have a magnetic moment of about 1 T to about 2 T.

A magnetic recording head comprises a main pole extending to a media facing surface, a trailing shield disposed adjacent to the main pole, the trailing shield extending to the media facing surface, a trailing gap disposed between the main pole and the trailing shield, the trailing gap having a width of about 15 nm to about 30 nm, a spin torque oscillator disposed between the main pole and the trailing shield at the media facing surface, and a hot seed bilayer disposed between the spin torque oscillator and the trailing shield, the hot seed bilayer comprising a first layer comprising a first material and a second layer comprising a second material disposed adjacent to a surface of the main pole. The first material has a higher magnetic moment than that the second material. The first layer is disposed at the media facing surface and in contact with the trailing shield and the second layer is recessed from the media facing surface. A stripe height of the hot seed bilayer is equal to a stripe height of the spin torque oscillator.

The stripe height of the spin torque oscillator may be between about 20 nm to about 40 nm. The first material may have a magnetic moment of about 2.3 T, the second material may have a magnetic moment of about 1 T to about 2 T, and the trailing shield may comprise a material having a magnetic moment of about 1.6 T. A thickness of the second layer may account for about 30% to about 70% of a total thickness of the hot seed bilayer.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a main pole extending to a media facing surface;
   a trailing shield disposed adjacent to a first surface of the main pole;
   a spin torque oscillator disposed between the first surface of the main pole and the trailing shield at the media facing surface; and
   a hot seed bilayer disposed between the spin torque oscillator and the trailing shield, the hot seed bilayer comprising a first layer comprising a first material in contact with the trailing shield and a second layer comprising a second material disposed adjacent to the first surface of the main pole, wherein the first material has a higher magnetic moment than that the second material, and wherein the first layer of the hot seed bilayer is disposed at the media facing surface and the second layer of the hot seed bilayer is recessed from the media facing surface.

2. The magnetic recording head of claim 1, wherein the first layer of the hot seed bilayer and the second layer of the hot seed bilayer have the same thickness.

3. The magnetic recording head of claim 1, wherein the first layer of the hot seed bilayer and the second layer of the hot seed bilayer have different thicknesses.

4. The magnetic recording head of claim 1, wherein the first material has a magnetic moment of about 2.3 T and the second material has a magnetic moment of about 1 T to about 2 T.

5. A disk drive comprising the magnetic recording head of claim 1.

6. The magnetic recording head of claim 1, wherein the second layer of the hot seed bilayer is spaced from the trailing shield by the first layer of the hot seed bilayer.

7. A magnetic recording head, comprising:
   a main pole extending to a media facing surface;
   a trailing shield disposed adjacent to a first surface of the main pole;
   a spin torque oscillator disposed between the first surface of the main pole and the trailing shield at the media facing surface; and
   a hot seed bilayer disposed between the spin torque oscillator and the trailing shield, the hot seed bilayer comprising a first layer comprising a first material in contact with the trailing shield and a second layer comprising a second material disposed adjacent to the first surface of the main pole, wherein the first material has a higher magnetic moment than that the second material, wherein the first layer of the hot seed bilayer comprises cobalt iron and the second layer of the hot seed bilayer comprises nickel iron.

8. A magnetic recording head, comprising:
   a main pole extending to a media facing surface;
   a trailing shield disposed adjacent to the main pole, the trailing shield extending to the media facing surface;
   a spin torque oscillator disposed between the main pole and the trailing shield at the media facing surface;
   a hot seed bilayer disposed between the spin torque oscillator and the trailing shield, the hot seed bilayer comprising a first layer comprising a first material in contact with the trailing shield and a second layer comprising a second material disposed adjacent to a surface of the main pole and spaced from the trailing shield, wherein the first material has a higher magnetic moment than that the second material, and wherein a thickness of the first layer accounts for about 30% to about 70% of a total thickness of the hot seed bilayer; and
   a notch disposed between the hot seed bilayer and the spin torque oscillator, the notch being conformal with the spin torque oscillator.

9. The magnetic recording head of claim 8, wherein the notch comprises a high magnetic moment material.

10. The magnetic recording head of claim 8, wherein the notch comprises a low magnetic moment material.

11. The magnetic recording head of claim 8, wherein the notch is conformal with the hot seed bilayer, and wherein the notch and the first layer of the hot seed bilayer are disposed at the media facing surface and the second layer of the hot seed bilayer is recessed from the media facing surface.

12. The magnetic recording head of claim 8, wherein the first layer of the hot seed bilayer has a magnetic moment of about 2.3 T and the second layer of the hot seed bilayer has a magnetic moment of about 1 T to about 2 T.

13. A disk drive comprising the magnetic recording head of claim 8.

14. A magnetic recording head, comprising:
   a main pole extending to a media facing surface;
   a trailing shield disposed adjacent to the main pole, the trailing shield extending to the media facing surface;
   a spin torque oscillator disposed between the main pole and the trailing shield at the media facing surface;
   a hot seed bilayer disposed between the spin torque oscillator and the trailing shield, the hot seed bilayer comprising a first layer comprising a first material in contact with the trailing shield and a second layer comprising a second material disposed adjacent to a surface of the main pole, wherein the first material has a higher magnetic moment than that the second material, and wherein a thickness of the first layer accounts for about 30% to about 70% of a total thickness of the hot seed bilayer; and
   a notch disposed between the hot seed bilayer and the spin torque oscillator, the notch being conformal with the spin torque oscillator, wherein the hot seed bilayer is conformal with the spin torque oscillator.

15. The magnetic recording head of claim 14, wherein the hot seed bilayer has a stripe height of about 20 nm to about 40 nm.

16. A magnetic recording head, comprising:
   a main pole extending to a media facing surface;
   a trailing shield disposed adjacent to the main pole, the trailing shield extending to the media facing surface;
   a trailing gap disposed between the main pole and the trailing shield, the trailing gap having a width of about 15 nm to about 30 nm;
   a spin torque oscillator disposed between the main pole and the trailing shield at the media facing surface; and
   a hot seed bilayer disposed between the spin torque oscillator and the trailing shield, the hot seed bilayer comprising a first layer comprising a first material and a second layer comprising a second material disposed adjacent to a surface of the main pole,
   wherein the first material has a higher magnetic moment than that the second material,
   wherein the first layer is disposed at the media facing surface and in contact with the trailing shield and the second layer is recessed from the media facing surface, and
   wherein a stripe height of the hot seed bilayer is equal to a stripe height of the spin torque oscillator.

17. The magnetic recording head of claim 16, wherein the stripe height of the spin torque oscillator is between about 20 nm to about 40 nm.

18. The magnetic recording head of claim 16, wherein the first material has a magnetic moment of about 2.3 T, the second material has a magnetic moment of about 1 T to about 2 T, and the trailing shield comprises a material having a magnetic moment of about 1.6 T.

19. The magnetic recording head of claim 16, wherein a thickness of the second layer accounts for about 30% to about 70% of a total thickness of the hot seed bilayer.

20. A disk drive comprising the magnetic recording head of claim 16.

\* \* \* \* \*